(12) United States Patent
Yang et al.

(10) Patent No.: US 8,189,055 B2
(45) Date of Patent: May 29, 2012

(54) DIGITAL PHOTOGRAPHING APPARATUS AND METHOD OF CONTROLLING THE SAME

(75) Inventors: Wook Yang, Changwon (KR); Jin-min Chang, Changwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 673 days.

(21) Appl. No.: 12/315,207

(22) Filed: Dec. 1, 2008

(65) Prior Publication Data

US 2009/0153681 A1    Jun. 18, 2009

(30) Foreign Application Priority Data

Dec. 14, 2007  (KR) .................. 10-2007-0131048

(51) Int. Cl.
*H04N 5/228* (2006.01)
*H04N 5/232* (2006.01)

(52) U.S. Cl. .................. 348/208.12; 348/349

(58) Field of Classification Search .......... 396/52, 396/54, 128; 348/208.99, 208.1, 208.4, 208.12, 348/208.16, 221.1, 248, 345, 349, 352, 362
See application file for complete search history.

(56) References Cited

U.S. PATENT DOCUMENTS

| | | | | |
|---|---|---|---|---|
| 7,634,187 | B2* | 12/2009 | Li et al. | 396/121 |
| 2004/0239795 | A1* | 12/2004 | Kitajima | 348/362 |
| 2005/0088460 | A1* | 4/2005 | Ouchi et al. | 345/672 |
| 2005/0206774 | A1* | 9/2005 | Tsujimoto | 348/345 |

FOREIGN PATENT DOCUMENTS

| | | |
|---|---|---|
| CN | 1655589 A | 8/2005 |
| JP | 08-271781 A | 10/1996 |
| JP | 2004-012637 A | 1/2004 |
| JP | 2006-325083 A | 11/2006 |

\* cited by examiner

*Primary Examiner* — W. B. Perkey
*Assistant Examiner* — Minh Phan
(74) *Attorney, Agent, or Firm* — Drinker Biddle & Reath LLP

(57) ABSTRACT

A digital photographing apparatus that is capable of detecting the shaking of the apparatus by using an autofocusing (AF) process and a method of controlling the digital photographing apparatus are provided. These involve calculating a first focal value while focusing on an object by performing the AF process and comparing the first focal value with a second focal value of a location on an image captured by actually photographing the object. This location corresponds to a location corresponding to the first focal value. As a result of these features, the shaking of the digital photographing apparatus can be detected.

20 Claims, 7 Drawing Sheets

DIGITAL PHOTOGRAPHING APPARATUS AND METHOD OF CONTROLLING THE SAME

CROSS-REFERENCE TO RELATED PATENT APPLICATION

This application claims the benefit of Korean Patent Application No. 10-2007-0131048, filed on Dec. 14, 2007, in the Korean Intellectual Property Office, the entire contents of which is incorporated herein by reference.

BACKGROUND OF THE INVENTION

1. Field of the Invention

The present invention relates to a digital photographing apparatus and a method of controlling the digital photographing apparatus. More particularly, the present invention relates to a digital photographing apparatus capable of detecting shaking of the apparatus by using an autofocusing process and a method of controlling the digital photographing apparatus.

2. Description of the Related Art

In current times, digital photographing apparatuses are built into a variety of mobile electronic products including not only digital cameras but also cellular phones, personal digital assistants (PDAs), and the like. Thus, providing a photographing function has become an important feature in many electronic products.

Digital photographing apparatuses included in these electronic products include an auto-focusing function, which involves an operation of recognizing an object and focusing on the object in order to clearly photograph the object. In other words, before photographing the object, digital photographing apparatuses calculate a focal value by using an image obtained from the object, determine a direction in which a focusing lens moves and a distance by which the focusing lens moves on the basis of the focal value, and move the focusing lens according to the determined direction and distance so as to automatically focus on the object.

However, electronic products including digital photographing apparatuses tend to be miniaturized in order to be portable, whereas display units that display captured images are becoming larger and larger in recent times. Accordingly, an area of available space on an electronic product that a user can hold has been reduced. As a result, shaking increases when a user's finger firmly presses a release button in order to take a picture. This results in a blur of a photographic image taken using the electronic product.

When such an image blur is significant, display units included in electronic products can recognize such a significant, or serious, image blur. However, since the number of pixels of a display unit included in an electronic product is generally less than the number of pixels of an external large-sized display device, image blur that was not recognized by the display unit of the electronic product may be sometimes checked by the external display device. In this case, images need to be re-captured, or a desired picture cannot be obtained when photography of the same object or view is impossible to repeat.

SUMMARY OF THE INVENTION

The present invention provides a digital photographing apparatus capable of detecting shaking of the apparatus by using an autofocusing (AF) process, and a method of controlling the digital photographing apparatus.

According to an embodiment of the present invention, a method of controlling a digital photographing apparatus that performs an AF process is provided. The method includes the operations of: recognizing an object and generating a first image signal from the object; calculating a first focal value by performing the AF process on the first image signal; photographing the object so as to generate a second image signal; calculating a second focal value by performing the AF process on the second image signal; and comparing the first focal value with the second focal value so as to determine whether the digital photographing apparatus is shook.

In an example of the method, the first focal value may be a focal value corresponding to a location that belongs to a predetermined area on an image corresponding to the first image signal and is the best focused. The location may be a coordinate value of a specific point or an area including the specific point.

In an example of the method, the second focal value may be a focal value corresponding to a location on an image corresponding to a second image signal, whereby the location corresponds to the location on the image corresponding to the first image signal that is the best focused. The location may be a coordinate value of a specific point or an area including the specific point.

The method may further include the operations of calculating a first coordinate value from which the first focal value was obtained from the first image signal and storing the first coordinate value.

The method may further include the operation of comparing a size of data corresponding to the first image signal with a size of data corresponding to the second image signal. If the sizes of data corresponding to the first and second image signals are identical with each other, a second focal value of the second image signal corresponding to the first coordinate value may be calculated. On the other hand, if the sizes of data corresponding to the first and second image signals are not identical with each other, the first coordinate value may be converted into a second coordinate value and a second focal value of the second image signal corresponding to the second coordinate value may be calculated.

According to an example of the method, it may be determined that as a difference between the first focal value and the second focal value increases, the blur of an image becomes more severe.

In an example of the method, the first focal value and the second focal value may be luminance values of identical locations on areas of the images corresponding to the first image signal and the second image signal.

In an example of the method, it may be determined that as the luminance value of the second image signal becomes smaller than the luminance value of the first image signal, the blur of an image becomes more severe.

The method may further include the operation of generating an icon that represents the degree to which the image is blurred and displaying the icon together with the second image signal.

In an example of the method, the icon and the second image signal may be displayed in a playback mode.

In an example of the method, the first image signal may be generated in a half shutter mode for focusing on the object, and the second image signal may be generated in a shutter mode for taking a picture of the object. In the half shutter mode, a user presses a release button of an automatic digital photographing apparatus slightly, that is, halfway, so that the automatic digital photographing apparatus may automatically recognize a distance from an object and focus on the object. When the object is in focus, a user may identify the focusing through a turned-on lamp of a viewfinder, a change of a focus guide from a red color, or other operations. The half shutter mode may perform various functions other than the function of helping the object to be focused, in order to obtain a desired image through photography under optimal conditions. For example, in the half shutter mode, the amount of light may be measured.

In an example of the shutter mode, the user firmly presses the release button when the object is in focus. Accordingly, in automatic digital photographing apparatuses, a final image is obtained by undergoing two stages, namely, a half shutter mode and a shutter mode. Consequently, a non-blurred image is obtained.

According to another embodiment of the present invention, there is provided a digital photographing apparatus that includes: an image sensing unit recognizing an object so as to generate a first image signal and photographing the object so as to generate a second image signal; and an AF unit calculating a first focal value from the first image signal, calculating a second focal value from the second image signal, and comparing the first focal value with the second focal value so as to determine a degree to which an image is blurred.

The AF unit may include: an AF process performing unit calculating the first focal value by performing an AF process on the first image signal and calculating the second focal value corresponding to a location corresponding to the first focal value by performing the AF process on the second image signal; a first focal value extraction unit extracting the first focal value from the AF process performing unit; a first coordinate value extraction unit extracting a first coordinate value corresponding to the first focal value from the AF process performing unit; a second focal value extraction unit extracting the second focal value from the AF process performing unit; and a comparison & determination unit comparing the first focal value with the second focal value and determining the degree to which the image is blurred according to a result of the comparison.

The AF process performing unit may include a storage unit for storing the first focal value and the first coordinate value. Alternatively, the digital photographing apparatus may further include a storage unit separately with the AF process performing unit, so as to store the first focal value and the first coordinate value.

The AF unit may include: an AF process performing unit calculating the first focal value by performing an AF process on the first image signal and calculating the second focal value corresponding to a location corresponding to the first focal value by performing the AF process on the second image signal; a first focal value extraction unit extracting the first focal value from the AF process performing unit; a first coordinate value extraction unit extracting a first coordinate value corresponding to the first focal value from the AF process performing unit; a size determination unit comparing a size of data corresponding to the first image signal with a size of data corresponding to the second image signal; a coordinate changing unit changing the first coordinate value into a second coordinate value if the sizes of data corresponding to the first and second image signals are not identical with each other; a second focal value extraction unit extracting the second focal value corresponding to the first coordinate value if the sizes of data corresponding to the first and second image signals are identical with each other, and extracting a second focal value corresponding to the second coordinate value if the sizes of data corresponding to the first and second image signals are not identical with each other; and a comparison & determination unit comparing the first focal value with the second focal value and determining the degree to which the image is blurred according to a result of the comparison.

In an example of the digital photographing apparatus, if the sizes of data corresponding to the first and second image signals are not identical with each other, the second focal value may be the mean of focal values of an area including the second coordinate value.

The AF unit may further include an icon generation unit generating an icon that represents the degree to which the image is blurred by comparing the first and second focal values with each other.

The digital photographing apparatus may further include a display unit displaying the icon provided by the icon generation unit, together with the second image signal.

The comparison & determination unit may determine the blur of an image to become more severe as a difference between the first focal value and the second focal value increases. Here, a focal value is a predetermined value obtained during a lens focusing operation, like a luminance value obtained from an image captured by a lens. It is deemed that as the focal value is greater, focusing accuracy is higher. Accordingly, as the second focal value obtained from the second image signal captured by photographing the object becomes smaller than the first focal value calculated by focusing on the object before photographing the object, the blur of an image of the object can be determined to worsen.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
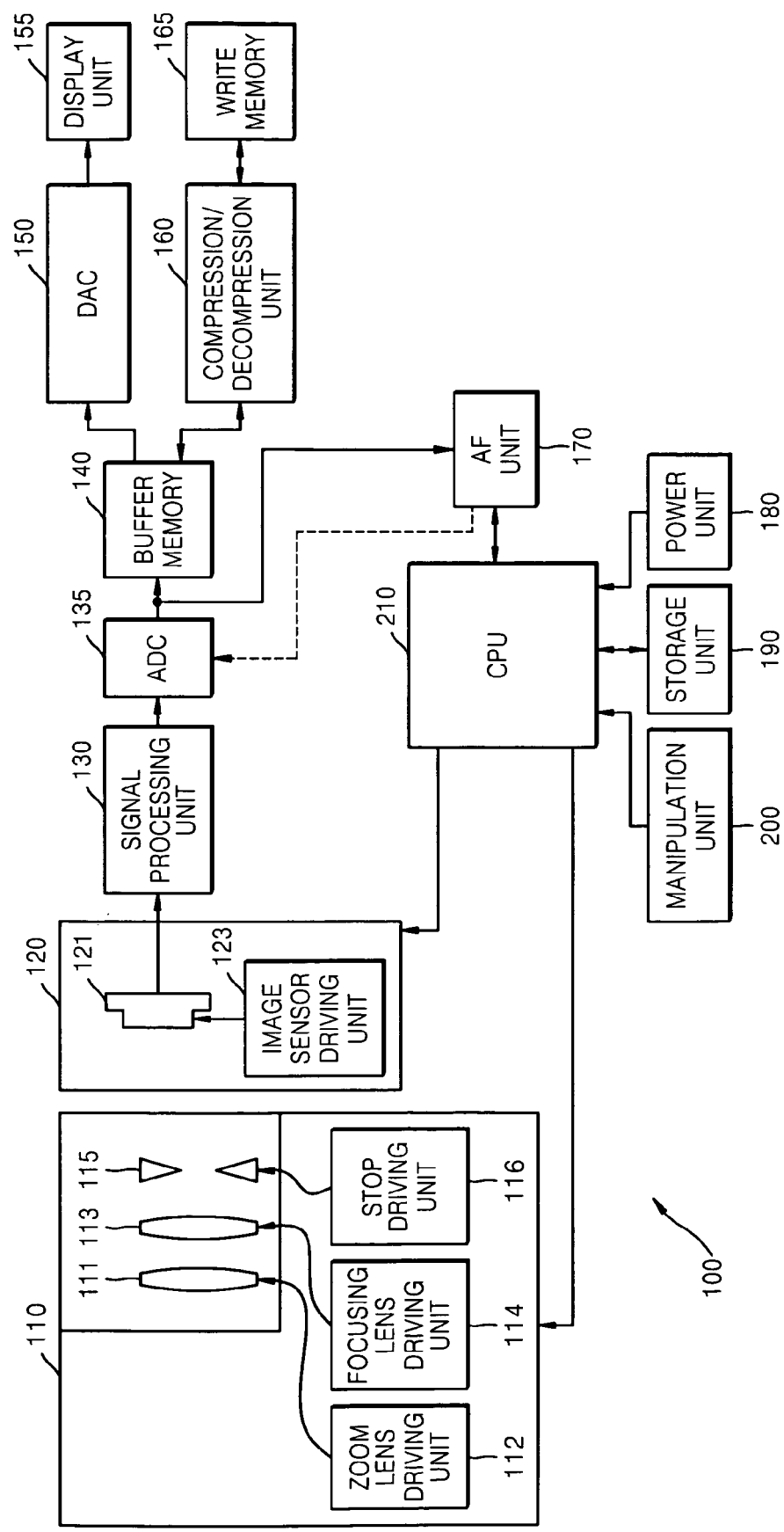
FIG. 1 is a block diagram of an example of a structure of a digital photographing apparatus according to an embodiment of the present invention.

FIG. 1 is a block diagram of an example of a structure of a digital photographing apparatus 100 according to an embodiment of the present invention. The digital photographing apparatus 100 is just an example of a digital photographing apparatus according to the present invention, and the present invention is not limited thereto. In other words, the digital photographing apparatus according to the present invention is not limited to the connections between components illustrated in FIG. 1, and the components may be connected to each other in other various ways. In addition, the digital photographing apparatus according to the present invention may further include other components that perform additional functions.

In the digital photographing apparatus 100, light reflected by an object is transmitted to an image sensing unit 120 via a photographing unit 110.

More specifically, the photographing unit 110 includes a zoom lens 111, a focusing lens 113, a stop 115, a zoom lens driving unit 112, a focusing lens driving unit 114, and a stop driving unit 116. The zoom lens driving unit 112, the focusing lens driving unit 114, and the stop driving unit 116 control the zoom lens 111, the focusing lens 113, and the stop 115, respectively.

The light received via the photographing unit 110, namely, an optical signal, is converted into an electrical signal by the image sensing unit 120. More specifically, the image sensing unit 120 includes an image sensor 121 for converting an optical signal into an electrical signal, such as, for example, a charge coupled device (CCD) or a complementary metal oxide semiconductor (CMOS) image sensor (CIS), and an image sensor driving unit 123 for driving the image sensor 121.

The electrical signal generated by the image sensor 121 undergoes a predetermined signal processing in the signal processing unit 130. More specifically, the signal processing unit 130 performs signal processing, such as, for example, auto white balancing, auto exposure, or gamma correction, so as to improve the quality of an image signal in accordance with human visual perception. The signal processing unit 130 also performs image processing, such as, for example, color filter array interpolation, a color matrix, color correction, or color enhancement.

The image signal output by the signal processing unit 130, which is an analog signal, is converted into a digital image signal by an analog-to-digital converter (ADC) 135. An image signal stated in the specification may be, for example, an analog image signal or a digital image signal.

In the example of the present embodiment, the image signal received from the image sensor 121 is processed in the signal processing unit 130 and then converted into the digital signal in the ADC 135. However, the present invention is not limited to this embodiment. In other words, the image signal output from the image sensor 121 may be, for example, converted into a digital signal in the ADC 135 and then the digital signal may undergo image processing in the signal processing unit 130.

The resultant image signal is temporarily stored in a buffer memory 140. The temporarily stored image signal is converted back to an analog signal in a digital-to-analog converter (DAC) 150 and displayed on a display unit 155.

Alternatively, for example, the image signal temporarily stored in the buffer memory 140 is compressed by a compression/decompression unit 160 and stored in a write memory 165. Inversely, the compressed image signal stored in the write memory 165 is decompressed by the compression/decompression unit 160 and transmitted back to the buffer memory 140. The write memory 165 may be implemented as a variety of example memory types, such as a fixed semiconductor memory (e.g., flash memory), a semiconductor memory (e.g., a card-type flash memory) formed in a card or stick shape and attachable to or detachable from a device, a magnetic storage medium (e.g., a hard disk, a floppy disk, etc.), and the like.

An autofocusing (AF) process in an AF unit 170 is performed on the digital image signal output from the ADC 135 so that the digital photographing apparatus 100 can focus on the object. More specifically, the AF unit 170 calculates a first focal value corresponding to when the object is in focus, and calculates a second focal value corresponding to a location of the first focal value from an image signal obtained by photographing the object, by bringing the object into focus according to the first focal value. The AF unit 170 compares the first focal value with the second focal value and determines the degree of image blur to be greater as the difference between the first and second focal values increases.

Examples of special performances of the AF processes of embodiments of the present invention will be described later in greater detail with reference to FIGS. 2 through 4.

Referring back to FIG. 1, the digital photographing apparatus 100 includes a power unit 180, a storage unit 190, and a manipulation unit 200.

The power unit 180 supplies predetermined power to the digital photographing apparatus 100 so as to operate the same, and may include, for example, an interface that is connected to a battery, such as a builtable-in lithium ion battery, and/or an external power source.

The storage unit 190 may store programs associated with the operations of the digital photographing apparatus 100.

The manipulation unit 200 includes buttons used by users to manipulate the image sensor 121 or to perform a variety of set functions upon taking a photograph. For example, the manipulation unit 200 includes a power button, a release button for photographing an object, and function buttons for selecting either a photographing mode or a playback mode and for setting effect parameters. The manipulation unit 200 is not limited to these, and may include, for example, other various means, such as a touch screen, a touch pad, a remote controller, and the like.

The digital photographing apparatus 100 includes a CPU 210 for controlling all of the operations of the digital photographing apparatus 100.

The CPU 210 includes a timing generation unit (not shown), which generates a timing signal. According to the timing signal, the signal processing unit 130 may perform, for example, a variety of image processing operations such as color signal separation. The image sensor driving unit 123 also controls the operation of the image sensor 121 according to the timing signal.

The CPU 210 outputs a predetermined control signal to the zoom lens driving unit 112, the focusing lens driving unit 114, and the stop driving unit 116 so that the zoom lens driving unit 112, the focusing lens driving unit 114, and the stop driving unit 116 can control the zoom lens 111, the focusing lens 113, and the stop 115, respectively, according to the control signal.

The block diagram of the digital photographing apparatus 100 of FIG. 1 shows components distinguished according to their functions. Thus, the components may be implemented as separate chips, and at least two components may form a single chip.

Operations of the digital photographing apparatus 100 will now be described in greater detail.

First, when describing an operation of photographing an object, light from the object passes through the zoom lens 111 and the focusing lens 113, which constitute an optical system of the photographing unit 110, the amount of light is adjusted by the stop 115, and an image corresponding to the object lands on a light-receiving side of the image sensor 121. The stop 115 is open in a normal state or in a state when an AF process is performed in response to a first release signal formed when a release button is pressed halfway. The stop 115 receives a second release signal formed due to the release button being fully pressed, and performs an exposure in response to the second release signal. A mode in which the process using the AF process is performed in response to the first release signal may be referred to as a half shutter mode, and a mode in which the exposure is performed in response to the second release signal may be referred to as a shutter mode.

Next, when describing an operation of forming an image signal, the object image formed on the light-receiving side of the image sensor 121 is converted into an electrical signal by photoelectrical conversion, and the electrical signal is output to the signal processing unit 130. The signal processing unit 130 performs a variety of image processing operations with respect to the electrical signal received from the image sensor 121, outputs an image signal obtained by the image processing to the ADC 135 in order to convert the same into a digital signal, and temporarily stores the digital signal in the buffer memory 140. The image signal stored in the buffer memory 140 is output to the DAC 150 and converted into an analog image signal that contributes to optimal display. An image corresponding to the analog image signal is displayed on the display unit 155. The display unit 155 also serves as a view finder for determining a photographing range by consecutively displaying image signals obtained by the image sensor 121 during a photographing mode.

The resultant image signal may be stored in the write memory 165. More specifically, when the exposure is performed in response to the second release signal, the image signal temporarily stored in the buffer memory 140 is output to the compression/decompression unit 160. The compression/decompression unit 160 compresses or encodes the image signal by using a compression circuit (not shown) included therein so that the compressed or encoded image signal can have a form optimal to be stored. The compressed image signal is stored in the write memory 165.

When a playback mode starts in response to an external signal input by, for example, a user via the manipulation unit 200, the compressed image signal stored in the write memory 165 is output to the compression/decompression unit 160 and decoded or decompressed using a decompression circuit. The result of the decoding or decompression is output to the buffer memory 140 and temporarily stored therein. The image signal is output to the DAC 150 and converted into an analog image signal which is optimal to be displayed. The analog image signal can be reproduced on the display unit 155.

The digital image signal obtained by the ADC 135 is also output to the AF unit 170. The AF unit 170 extracts a high frequency component of an image signal corresponding to one screen from the received digital image signal by using a highpass filter for example, and performs an arithmetic operation such as an accumulative addition. In other words, the AF unit 170 calculates a focal value corresponding to, for example, a contour component amount (such as, for example, a luminance value) of the extracted high-frequency component. Accordingly, the AF unit 170 calculates the focal value by performing the AF process. The focal value is output to the CPU 210, and the CPU 210 outputs a predetermined control signal to the focusing lens driving unit 114 in order to move the focusing lens 113 so as to focus on the object.

The focal value is generated by a first release signal and is used to focus on the object. If this focal value is referred to as a first focal value, in the present invention, a second focal value is calculated by performing the AF process on the image signal generated by photographing the object. A degree to which an image corresponding to the object is blurred is determined by comparing the first focal value with the second focal value. These operations are performed in the AF unit 170.

The AF unit 170 will now be described in greater detail with reference to FIG. 2, which is a block diagram of an example of an AF unit 170a of the digital photographing apparatus illustrated in FIG. 1, according to an embodiment of the present invention.

Figure 2:
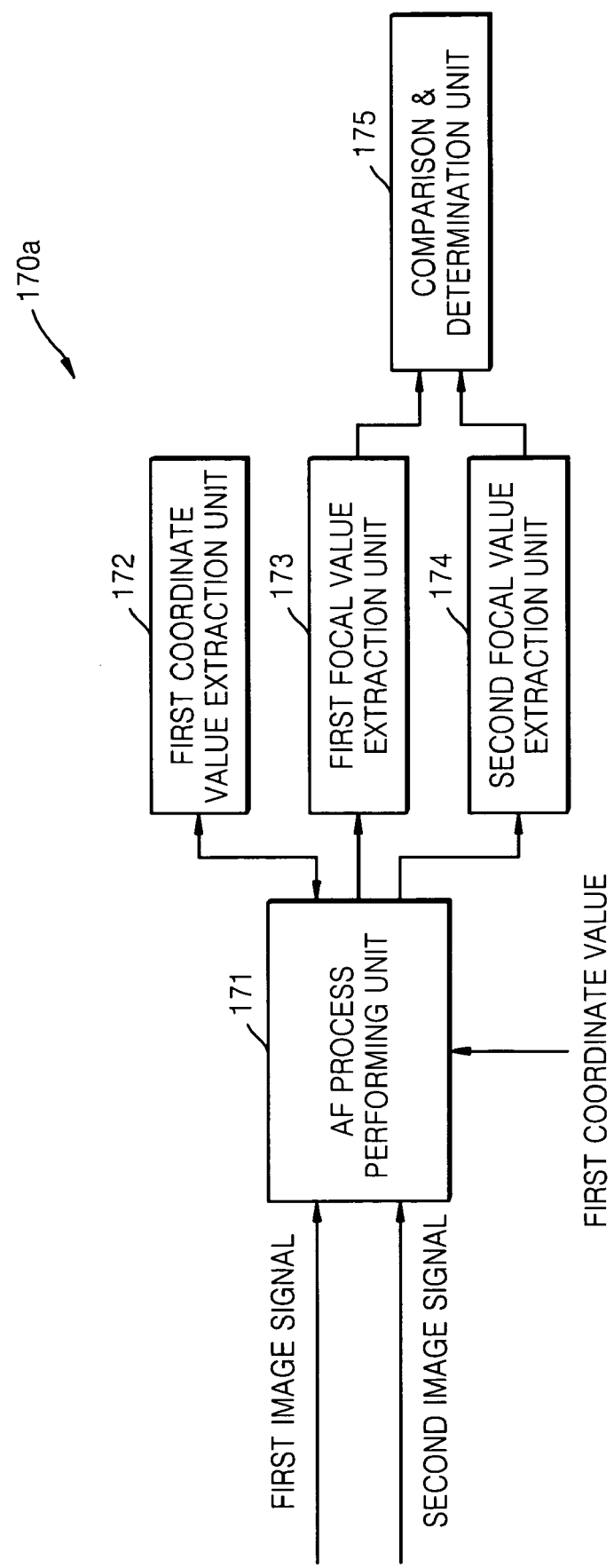
FIG. 2 is a block diagram of an example of an autofocusing (AF) unit of the digital photographing apparatus illustrated in FIG. 1, according to an embodiment of the present invention.

Referring to FIG. 2, the AF unit 170a includes an AF process performing unit 171 for performing an AF process on an image signal.

The AF process performing unit 171 performs an AF process for extracting high frequency components from a first image signal generated in response to a first release signal and a second image signal generated in response to a second release signal and calculating first and second focal values by performing an arithmetic operation, such as accumulative addition, on the high frequency components. Each of the first and second image signals constitutes a single screen.

The first focal value for the first image signal can be obtained before photographing in order to obtain a picture on which the object is in focus. The second focal value for the second image signal is obtained from an image signal generated by photographing the object by bringing the object into focus according to the first focal value.

First, when the first release signal is input, the AF process performing unit 171 performs the AF process on the first image signal, which constitutes a single screen, thereby calculating the first focal value and a first coordinate value corresponding to the first focal value.

A first coordinate value extraction unit 172 and a first focal value extraction unit 173 can extract the first focal value and the first coordinate value from the AF process performing unit 171. The first coordinate value extraction unit 172 and the first focal value extraction unit 173 can also temporarily store the first coordinate value and the first focal value, respectively.

When the second release signal is input, the second image signal is generated and input to the AF process performing unit 171, which performs the AF process on the second image signal. The AF process is performed to calculate a focal value corresponding to the first coordinate value from the second image signal. In other words, the first focal value may be a focal value corresponding to a specific location (which can be, for example, a point or an area) on the object, which has high-frequency characteristics extracted by scanning the first image signal. The second focal value may be a focal value that corresponds to the specific location of the first focal value and is obtained from the second image signal.

The AF process performing unit 171 calculates the second focal value from the second image signal. The second focal value extraction unit 174 can extract the second focal value from the AF process performing unit 171 and store the same.

The first focal value extraction unit 173 and the second focal value extraction unit 174 output the first focal value and the second focal value to the comparison & determination unit 175. The comparison & determination unit 175 can determine whether the first focal value is identical with the second focal value and/or determine the difference between the first and second focal values if they are different.

It is deemed that as the difference between the first focal value and the second focal value increases, the effect of shaking on an image captured by photographing an object worsens. When the first and second focal values are luminance values, as the second focal value becomes smaller than the first focal value, the effect of shaking on the image worsens.

Figure 3:
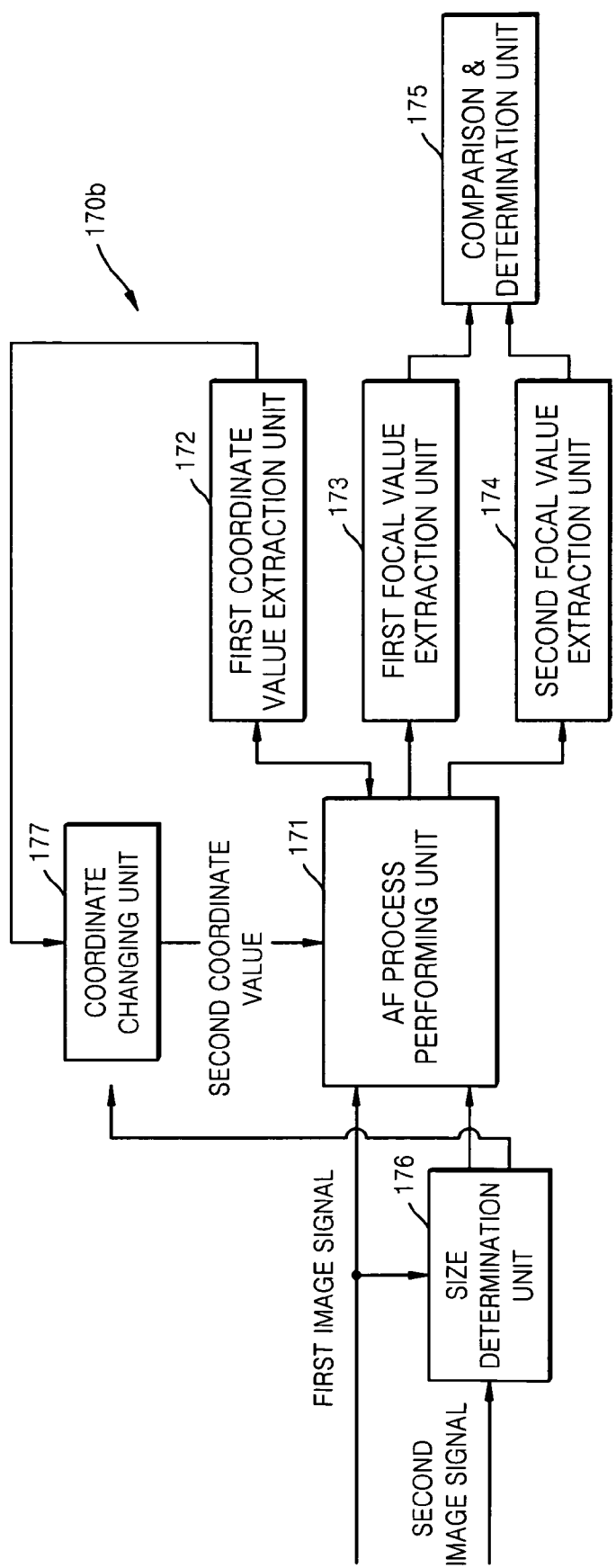
FIG. 3 is a block diagram of an example of an AF unit of the digital photographing apparatus illustrated in FIG. 1, according to another embodiment of the present invention.

FIG. 3 is a block diagram of an example of an AF unit 170b of the digital photographing apparatus illustrated in FIG. 2, according to another embodiment of the present invention.

Referring to FIG. 3, the AF process performing unit 171 calculates the first focal value and the first coordinate value by performing an AF process on the first image signal, and outputs the first focal value and the first coordinate value to the first coordinate value extraction unit 172 and the first focal value extraction unit 173, respectively. In terms of this operation of the AF process performing unit 171, the AF unit 170b is the same as the AF unit 170a illustrated in FIG. 2.

However, the AF unit 170b is different from the AF unit 170a in terms of a location corresponding to a second focal value to be calculated from the second image signal. The AF unit 170b will now be described by focusing on this difference.

When a second image signal generated in response to a second release signal is input to the AF unit 170b, the second image signal is input to a size determination unit 176. The size determination unit 176 compares the size of data corresponding to the second image signal with the size of data corresponding to the first image signal input prior to the input of the second image signal.

If the data sizes of the first and second image signals are equal, the second image signal is input to the AF process performing unit 171, and the AF process performing unit 171 calculates the second focal value corresponding to the first coordinate value from the second image signal.

On the other hand, if the data sizes of the first and second image signals are different, the second image signal undergoes coordinate conversion because the location on an object corresponding to the first coordinate value is changed. A coordinate changing unit 177 receives the first coordinate value from the first coordinate value extraction unit 172 and changes the first coordinate value into a second coordinate value according to a difference between the data sizes of the first and second image signals. The second coordinate value is input to the AF process performing unit 171.

The AF process performing unit 171 calculates a second focal value of the location (which may be, for example, a point or an area) corresponding to the received second coordinate value from the second image signal. If the location is a certain area, the second focal value may be the mean of the focal values of the area. The present invention is not limited to this way of obtaining the second focal value.

The second focal value extraction unit 174 extracts the second focal value from the AF process performing unit 171, stores the same, and outputs the second focal value to the comparison & determination unit 175.

The first focal value extraction unit 173 outputs the first focal value to the comparison & determination unit 175.

The comparison & determination unit 175 compares the first focal value with the second focal value and determines the degree of the effect of shaking on an image according to a difference between the first and second focal values. Here, the image denotes an image corresponding to the second image signal constituting a single screen.

Figure 4:
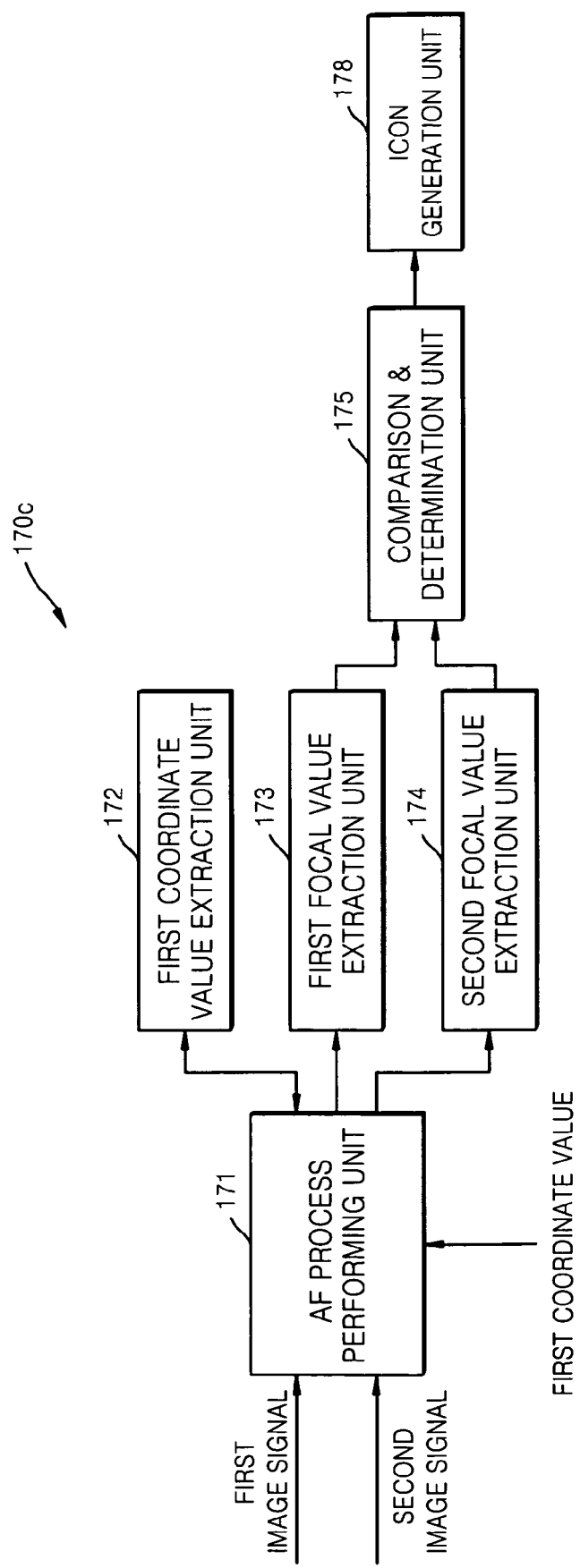
FIG. 4 is a block diagram of an example of an AF unit of the digital photographing apparatus illustrated in FIG. 1, according to another embodiment of the present invention.

FIG. 4 is a block diagram of an example of an AF unit 170c of the digital photographing apparatus illustrated in FIG. 1, according to another embodiment of the present invention. The AF unit 170c is the same as the AF unit 170a illustrated in FIG. 2, in that a first focal value is calculated from a first image signal, a second focal value is calculated from a second image signal, and the first and second focal values are compared with each other in order to determine the effect of shaking on an image.

In contrast with the AF unit 170a illustrated in FIG. 2, in the AF unit 170c, a comparison & determination unit 175 compares the first focal value with the second focal value in order to determine the degree of the effect of shaking on an image, and outputs a result of the determination to an icon generation unit 178. The icon generation unit 178 generates an icon corresponding to the determination result and outputs the icon to the buffer memory 140 (see FIG. 1) via the ADC 135 (see FIG. 1). After being temporarily stored in the buffer memory 140, the icon may pass together with the second image signal, which constitutes a single screen, through the DAC 150, and the icon and the second image signal may be displayed on the display unit 155. In FIG. 1, transmission of the icon is indicated by a dotted line.

The AF unit 170b of FIG. 3 may further include such an icon generation unit as the icon generation unit 178.

In FIGS. 2 through 4, the components including the first coordinate value extraction unit 172, the first focal value extraction unit 173, and the second focal value extraction unit 174 are distinguished from each other according to their functions. However, at least two functions may be performed in a single component, for example.

Figure 5:
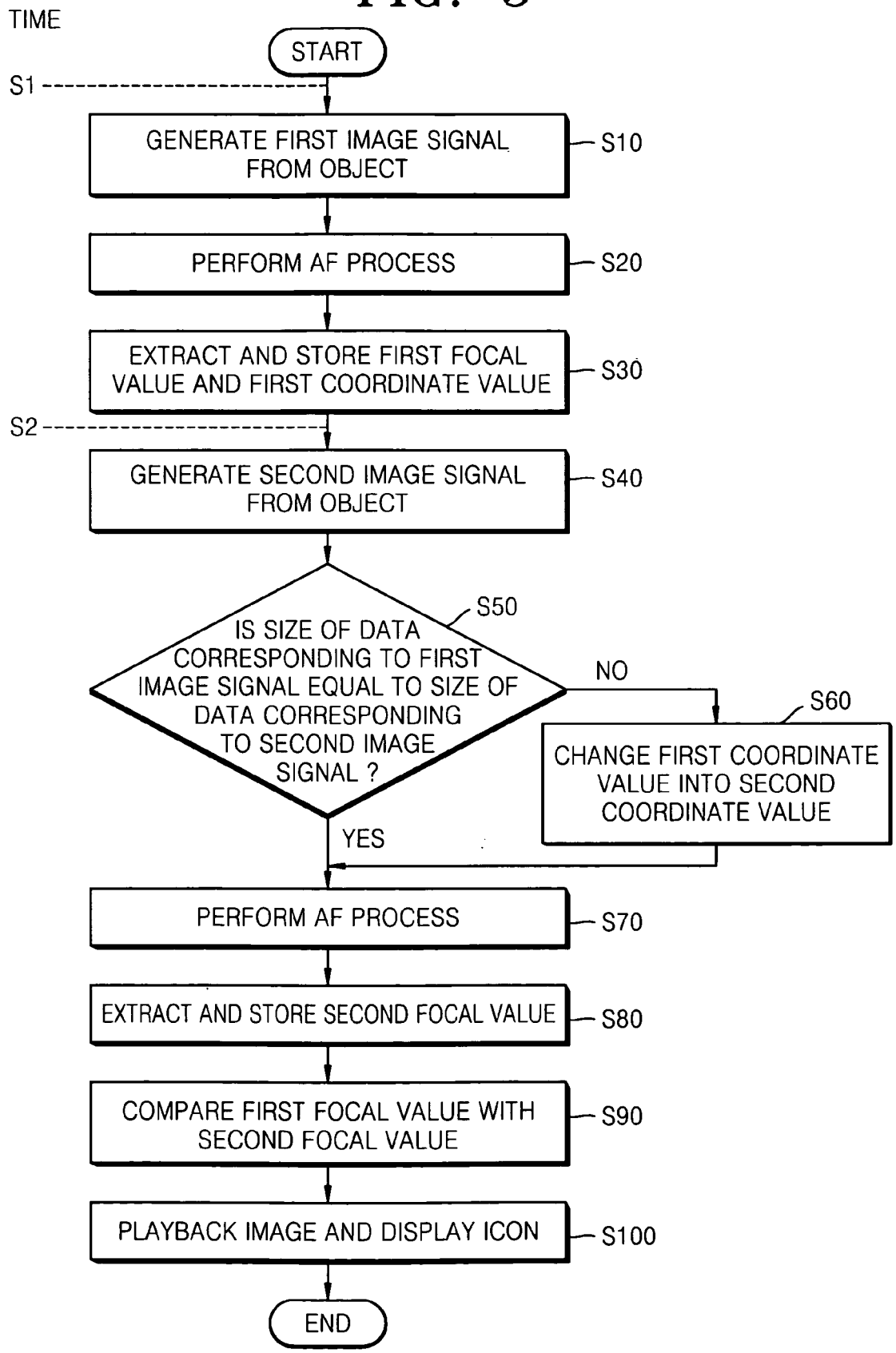
FIG. 5 is a flowchart illustrating an example of a method of controlling a digital photographing apparatus, according to an embodiment of the present invention.

FIG. 5 is a flowchart illustrating an example of a method of controlling a digital photographing apparatus, according to an embodiment of the present invention.

Referring to FIG. 5, in operation S10, when a first release signal is generated, for example, at a time S1 when a half shutter mode, in which a user presses a release button halfway, starts, a first image signal is generated from an object.

In operation S20, an AF process for calculating a first focal value corresponding to the amount of a high-frequency contour component from the first image signal, which constitutes a single screen, is performed. A focusing lens is moved according to the first focal value in order to focus on the object.

In operation S30, the first focal value and a first coordinate value corresponding to a location from which the first focal value is derived are extracted and stored.

In operation S40, when a second release signal is generated by a user firmly pressing the release button, that is, at a time S2 when the digital photographing apparatus is in a shutter mode, a second image signal is generated from the object. The second image signal corresponds to an image obtained by photographing the object. In other words, the second image signal is stored and reproduced so that an image is displayed on a display unit so that users or viewers can view the image. Of course, the second image signal may undergo predetermined signal processing so as to be optimally reproduced, before being displayed on the display unit.

In operation S50, it is determined whether the size of data corresponding to the first image signal stored prior to the second image signal is equal to the size of data corresponding to the second image signal. If it is determined in operation S50 that the sizes of data corresponding to the first and second image signals are equal to each other, the first coordinate value from which the first focal value of the first image signal is derived is used. On the other hand, if it is determined in operation S50 that the sizes of data corresponding to the first and second image signals are different from each other, a second coordinate value is calculated by changing the first coordinate value according to a difference between the two sizes, in operation S60. In other words, the second coordinate value denotes a location on the second image signal that corresponds to a specific point or area on the first image signal from which the first focal value is derived.

In operation S70, an AF process for calculating a second focal value corresponding to the first or second coordinate value from the second image signal is performed.

In operation S80, the second focal value is extracted and stored. In operation S90, the first focal value is compared with the second focal value. It can be determined that as a difference between the first focal value and the second focal value increases, the blur of the image obtained by photographing the object, that is, an image to be displayed on the display unit, worsens. When the first and second focal values are luminance values, it can be determined that as the second focal value becomes smaller than the first focal value, the blur of the image worsens.

In operation S100, the degree to which the image is blurred is represented by an icon, and the icon and the second image signal are displayed together. Accordingly, when users photograph an object by bringing it into focus by performing an AF process, the digital photographing apparatus can easily recognize the blur of an object image caused by an error that can be generated between the times S1 and S2.

Figure 6:
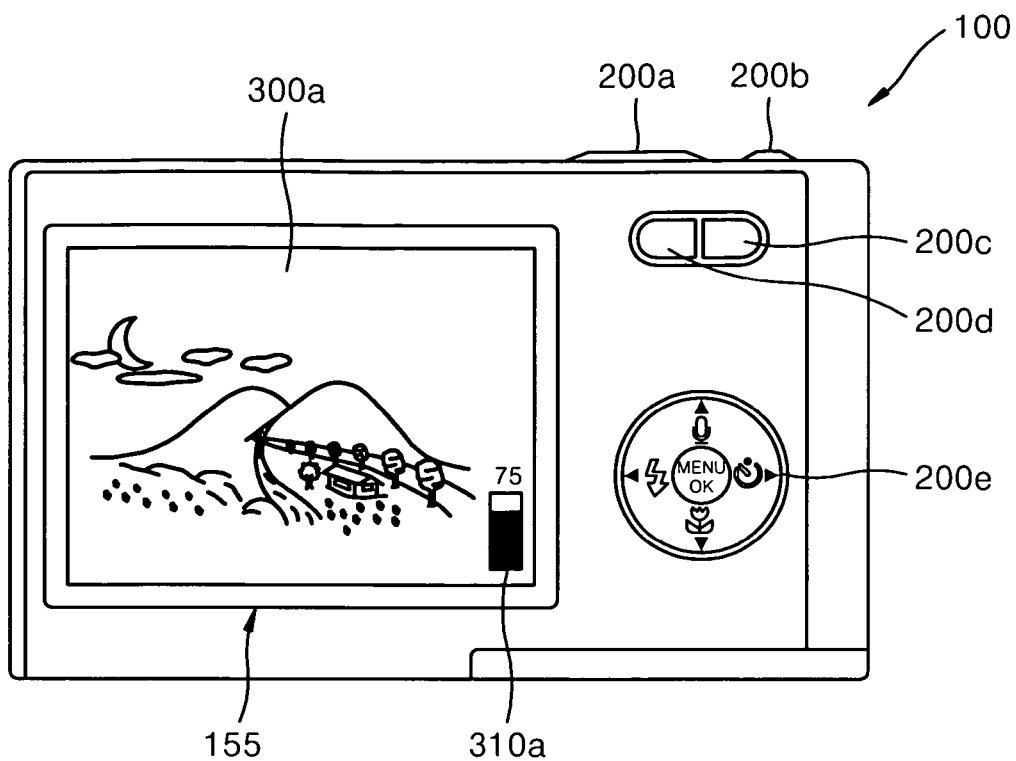
FIGS. 6 and 7 illustrate examples of images displayed according to the digital photographing apparatus controlling method illustrated in FIG. 5.
Figure 7:
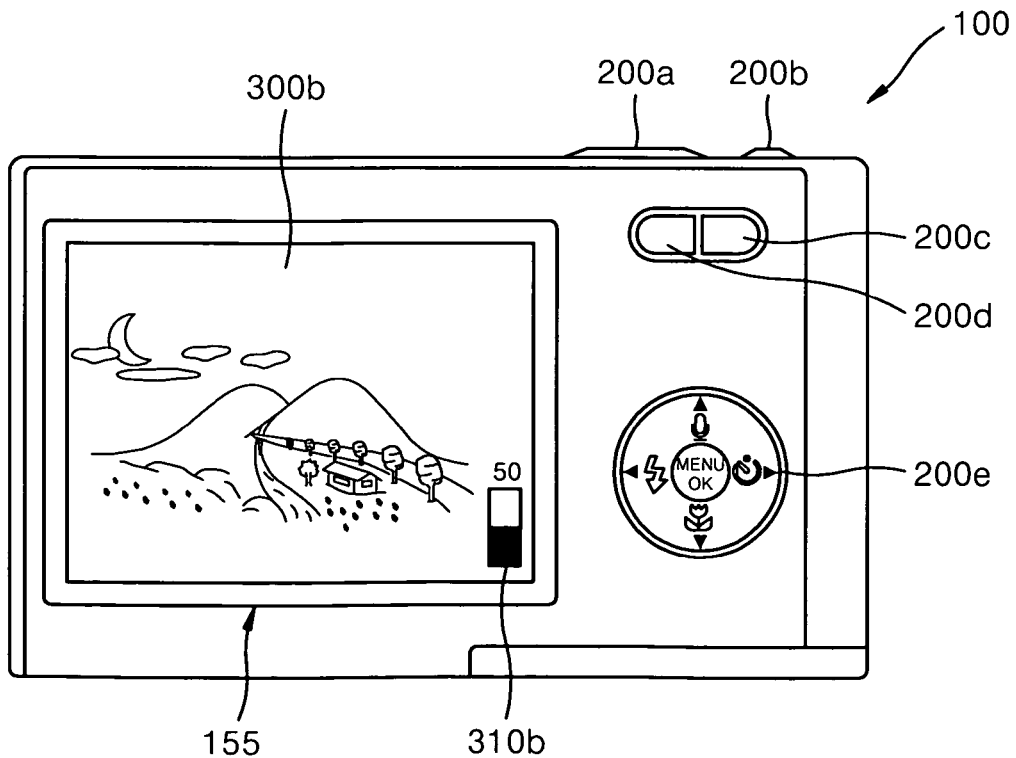

FIGS. 6 and 7 illustrate examples of images displayed together with icons according to the digital photographing apparatus controlling method illustrated in FIG. 5.

A digital camera is used as the digital photographing apparatus 100, a liquid crystal display (LCD) is installed as the display unit 155 on one side of the digital camera, a magnification button 200c and a reduction button 200d are installed on the same side as the side on which the LCD is installed, and various function buttons 200e for performing predetermined functions are installed. In addition, a power button 200b and a release button 200a used by a user to generate a release signal are installed on the upper side of the digital camera.

Referring to FIG. 6, a first image 300a captured by focusing on a house is displayed on the display unit 155. A first icon 310a, which represents that the first image 300a was captured by focusing on the house with a focus accuracy of 75, is also displayed on the display unit 155.

Meanwhile, FIG. 7 illustrates a second image 300b, which is obtained by photographing the same object as the first image 300a but is more blurry than the first image 300a. Accordingly, the second image 300b is displayed together with the second icon 310b representing a smaller focus accuracy, namely, a focus accuracy of 50, instead of the focus accuracy of 75 of the first image 300a.

Figure 8:
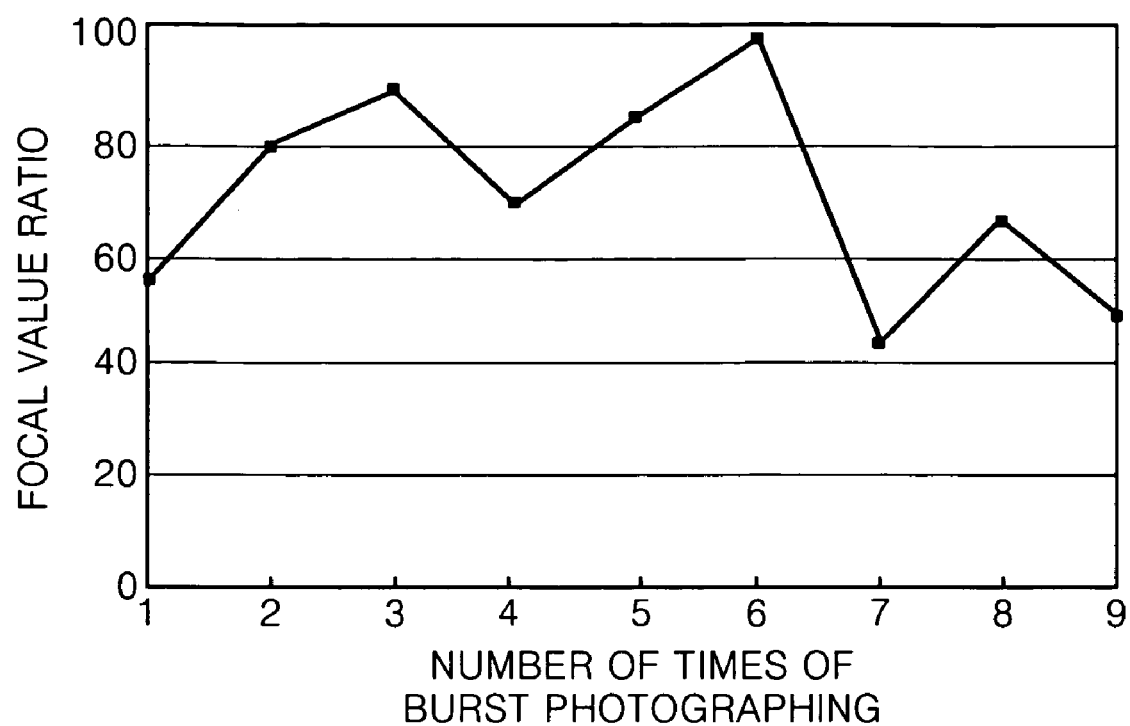
FIG. 8 is a graph showing an example of the degree to which an image is blurred when a digital photographing apparatus according to the present invention performs a burst.

FIG. 8 is a graph showing an example of the degree of the effect of shaking on an image when a digital photographing apparatus according to the present invention performs a burst. For example, FIG. 8 shows an example of the degree to which an image is blurred when a digital photographing apparatus according to the present invention performs a burst.

A burst mode generates at least two second release signals after generating a first release signal. In other words, the burst mode denotes a mode in which an object is photographed at least twice in a row after being brought into focus by performing an AF process. Accordingly, a signal first image signal is generated, and a first focal value is calculated from the first image signal. Thereafter, at least two second image signals are generated by photographing the object, and a plurality of second focal values can be calculated from the second image signals.

Therefore, ratios between the first focal value and the second focal values are calculated as percentages and illustrated in a graph as in FIG. 8, and thus the degrees of blurring in relation to the second image signals can be determined.

In the embodiment 9 images were captured during a burst mode. A rate of the second focal value in relation to the first focal value and the second focal value upon first burst photographing was about 55, and a rate of the second focal value in relation to the first focal value upon second burst photographing was about 80. The other ratios upon third through ninth burst photographing were calculated as illustrated in FIG. 8. Thus, users can select a second image signal corresponding to the best-focused image from among 9 second image signals corresponding to images obtained by 9 times of burst photographing.

In a digital photographing apparatus and a method of controlling the same according to the present invention as described above, an AF process may be used to focus on an object and to calculate a focal value from an image obtained by photographing the object, and may also be used to compare the calculated focal value with a focal value calculated while recognizing the object, thereby detecting a blur of the image. Therefore, when an image obtained by a user is determined to be very blurry, re-photographing can be performed. Also, a file of the blurry image can be deleted from the digital photographing apparatus, so that unnecessary use of a storage space in the digital photographing apparatus can be prevented.

Moreover, the detected degree of image blur can be displayed via an icon, and thus users can easily recognize the blur of the image even from a display unit of the digital photographing apparatus which has a relatively smaller number of pixels than external display devices, such as, LCDs or OLEDs.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a digital photographing apparatus that performs an autofocusing process, the method comprising:
   recognizing an object and generating a first image signal from the object;
   calculating a first focal value by performing the autofocusing process on the first image signal;
   photographing the object so as to generate a second image signal;
   calculating a second focal value by performing the autofocusing process on the second image signal; and
   comparing the first focal value with the second focal value so as to determine whether the digital photographing apparatus is shook,
   wherein the autofocusing process on the second image signal is performed after comparing a size of data corresponding to the first image signal with a size of data corresponding to the second image signal.

2. The method of claim 1, wherein the first focal value is a focal value corresponding to a location that belongs to a predetermined area on an image corresponding to the first image signal and is the best focused.

3. The method of claim 1, wherein the second focal value is a focal value corresponding to a location on an image corresponding to the second image signal, whereby the location corresponds to the location on the image corresponding to the first image signal that is the best focused.

4. The method of claim 1, further comprising:
   calculating a first coordinate value from which the first focal value was obtained from the first image signal; and
   storing the first coordinate value.

5. The method of claim 1, wherein, as a difference between the first focal value and the second focal value increases, the blur of an image becomes more severe.

6. The method of claim 5, wherein the first focal value and the second focal value are luminance values of identical locations on areas of the images corresponding to the first image signal and the second image signal.

7. The method of claim 6, wherein, as the luminance value of the second image signal becomes smaller than the luminance value of the first image signal, the blur of an image becomes more severe.

8. The method of claim 1, further comprising generating an icon that represents the degree to which the image is blurred and displaying the icon together with the second image signal.

9. The method of claim 8, wherein the icon and the second image signal are displayed in a playback mode.

10. The method of claim 1, wherein the first image signal is generated in a half shutter mode for focusing on the object.

11. The method of claim 1, wherein the second image signal is generated in a shutter mode for taking a picture of the object.

12. A method of controlling a digital photographing apparatus that performs an autofocusing process, the method comprising:
recognizing an object and generating a first image signal from the object;
calculating a first focal value by performing the autofocusing process on the first image signal;
calculating a first coordinate value from which the first focal value was obtained from the first image signal;
storing the first coordinate value;
photographing the object so as to generate a second image signal;
comparing a size of data corresponding to the first image signal with a size of data corresponding to the second image signal;
if the sizes of data corresponding to the first and second image signals are identical with each other, calculating a second focal value of the second image signal corresponding to the first coordinate value by performing the autofocusing process on the second image signal;
if the sizes of data corresponding to the first and second image signals are not identical with each other, converting the first coordinate value into a second coordinate value and calculating a second focal value of the second image signal corresponding to the second coordinate value by performing the autofocusing process on the second image signal; and
comparing the first focal value with the second focal value so as to determine whether the digital photographing apparatus is shook.

13. A digital photographing apparatus comprising:
an image sensing unit that recognizes an object, generates a first image signal, photographs the object by bringing the object into focus based on the first image signal, and generates a second image signal; and
an autofocusing unit that calculates a first focal value from the first image signal, the first focal value corresponding to when the object of the first image signal is in focus, calculates a second focal value from the second image signal, the second focal value corresponding to when the object of the second image signal is in focus, and compares the first focal value with the second focal value so as to determine a degree to which an image is blurred,
wherein the autofocusing unit calculates the second focal value from the second image signal after comparing a size of data corresponding to the first image signal with a size of data corresponding to the second image signal.

14. The digital photographing apparatus of claim 13, wherein the autofocusing unit comprises:
an autofocusing process performing unit that calculates the first focal value by performing an autofocusing process on the first image signal and that calculates the second focal value corresponding to a location corresponding to the first focal value by performing the autofocusing process on the second image signal;
a first focal value extraction unit that extracts the first focal value from the autofocusing process performing unit;
a first coordinate value extraction unit that extracts a first coordinate value corresponding to the first focal value from the autofocusing process performing unit;
a second focal value extraction unit that extracts the second focal value from the autofocusing process performing unit; and
a comparison and determination unit that compares the first focal value with the second focal value and determines the degree to which the image is blurred according to a result of the comparison.

15. The digital photographing apparatus of claim 14, wherein the autofocusing unit further comprises an icon generation unit that generates an icon that represents the degree to which the image is blurred by comparing the first and second focal values with each other.

16. A digital photographing apparatus comprising:
an image sensing unit that recognizes an object, generates a first image signal, photographs the object, and generates a second image signal; and
an autofocusing unit that calculates a first focal value from the first image signal, calculates a second focal value from the second image signal, and compares the first focal value with the second focal value so as to determine a degree to which an image is blurred, wherein the autofocusing unit comprises:
an autofocusing process performing unit that calculates the first focal value by performing an autofocusing process on the first image signal and that calculates the second focal value corresponding to a location corresponding to the first focal value by performing the autofocusing process on the second image signal;
a first focal value extraction unit that extracts the first focal value from the autofocusing process performing unit;
a first coordinate value extraction unit that extracts a first coordinate value corresponding to the first focal value from the autofocusing process performing unit;
a size determination unit that compares a size of data corresponding to the first image signal with a size of data corresponding to the second image signal;
a coordinate changing unit that changes the first coordinate value into a second coordinate value if the sizes of data corresponding to the first and second image signals are not identical with each other;
a second focal value extraction unit that extracts the second focal value corresponding to the first coordinate value if the sizes of data corresponding to the first and second image signals are identical with each other, and that extracts a second focal value corresponding to the second coordinate value if the sizes of data corresponding to the first and second image signals are not identical with each other; and
a comparison and determination unit that compares the first focal value with the second focal value and determines the degree to which the image is blurred according to a result of the comparison.

17. The digital photographing apparatus of claim 16, wherein if the sizes of data corresponding to the first and second image signals are not identical with each other, the second focal value is the mean of focal values of an area including the second coordinate value.

18. The digital photographing apparatus of claim 16, wherein the autofocusing unit further comprises an icon generation unit that generates an icon that represents the degree to which the image is blurred by comparing the first and second focal values with each other.

19. The digital photographing apparatus of claim 16, further comprising a display unit that displays the icon provided by the icon generation unit, together with the second image signal.

20. The digital photographing apparatus of claim 16, wherein the comparison and determination unit determines the blur of an image to become more severe as a difference between the first focal value and the second focal value increases.

* * * * *